United States Patent [19]

Schultz

[11] 4,148,596

[45] Apr. 10, 1979

[54] PELLETIZING PRESS

[76] Inventor: Richard Schultz, 9402 Morschwil, Switzerland

[21] Appl. No.: 819,098

[22] Filed: Jul. 26, 1977

[30] Foreign Application Priority Data

Jul. 28, 1976 [IT] Italy ............................ 85581 A/76

[51] Int. Cl.[2] ............................................ B29F 3/012

[52] U.S. Cl. ........................ 425/331; 425/DIG. 230

[58] Field of Search ...... 425/331, 310, 311, DIG. 230

[56] References Cited

U.S. PATENT DOCUMENTS

| | | | |
|---|---|---|---|
| 2,875,709 | 3/1959 | Landers | 425/DIG. 230 |
| 3,354,845 | 11/1967 | Schultz | 425/331 X |
| 3,467,031 | 9/1969 | Hafliger | 425/331 |
| 3,807,926 | 4/1974 | Morse | 425/331 |

*Primary Examiner*—Robert L. Spicer, Jr.
*Attorney, Agent, or Firm*—Cushman, Darby & Cushman

[57] ABSTRACT

An improved pelletizing press for producing pressed feed products and the like, of the type comprising a radially perforated die with at least two pressing rollers oppositely mounted therein and driven by frictional engagement with the rotary die. The improvement provided by the invention consists of a large principal pressing roller providing increased pellet production with equal specific energy comsumption of the pelletizing press and at least one oppositely mounted auxiliary pressing roller which has a considerably smaller diameter than said principal pressing roller, and is mounted in opposed relation thereto so as to function as a compensating roller while providing a minor pressing action.

5 Claims, 4 Drawing Figures

PELLETIZING PRESS

The present invention relates to pelletizing presses of the type which is commonly used for the production of pressed feed pellets from dried grass forage, processed hay and the like, and which essentially comprises an annular radially perforated rotary die and at least two pressing rollers oppositely mounted therein for free rotation and driven by frictional engagement with the rotary die.

Known pelletizing presses of this type are generally equipped with two or three pressing rollers of equal diameter which are mounted for free rotation between a fixed support member and a bearing plate and each have a perforated outer surface which is grooved, honeycombed or otherwise profiled in order to improve frictional engagement thereof with the inner surface of the rotary die and thereby provide compression of the loose material to be pelletized.

The costs of producing pressed feed pellets with conventional presses of this type notably depend on the amortization costs of the press itself and on the cost of periodic replacement of the rotary die due to wear.

However, the pellet production capacity of the press cannot be substantially raised by increasing the driving speed thereof since the maximum operating speed of the pelletizing press depends in each case on the inner diameter of the rotary die and must moreover be limited in order to avoid excessive wear of the die, among other parts of the press which are subject to wear. A main object of the present invention is to provide a pelletizing press with an increased pellet production without increasing the specific energy consumption per ton of produced pellets with respect to conventional pelletizing presses of the same general type, while the diameter of the rotary die, the operating speed and the drive power of the pelletizing press may be kept constant.

To this end, a pelletizing press of the above mentioned type is provided according to the invention with a large principal pressing roller for providing increased pellet production with the same specific energy consumption and further with at least one auxiliary pressing roller which has a considerably smaller diameter than said principal roller and is mounted in opposed relation thereto so as to function as a compensating roller while at the same time providing a minor pressing action.

As is apparent from the subsequent detailed description with reference to the drawing, the arrangement of a large principal pressing roller according to the invention, together with a much smaller auxiliary pressing roller oppositely arranged so as to function as a compensating roller, may be readily achieved by effecting only some minor constructive modifications with respect to a pelletizing press of orthodox design, said modifications essentially involving a simple replacement of the conventional rollers of equal size by a larger principal roller and at least one smaller auxiliary roller oppositely arranged in accordance with the invention.

The use of a larger principal pressing roller according to the invention provides a more continuous and progressive pressing action of this large principal roller on the material to be pelletized, thereby substantially enhancing the pelletizing action, whereby the production of pellets through the rotary die is significantly increased with respect to a conventional pelletizing press equipped with a similar rotary die and with pressing rollers of equal and hence smaller size.

Moreover, for a given peripheral speed of the rotary die, the rotative speed of the larger principal pressing roller is correspondingly decreased with respect to conventional smaller rollers, whereby wear of the rotary die may also be decreased accordingly.

By providing a larger principal pressing roller according to the invention, the amortization costs of the pelletizing press may thus be quite significantly reduced, due on one hand to the increased production of pellets and on the other to reduced wear of the rotary die.

The invention may be further explained by means of an embodiment given by way of example and shown in the accompanying drawing wherein.

Figure 4:
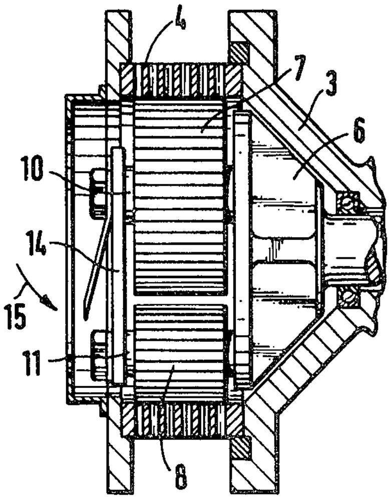
FIG. 4 is a longitudinal cross-sectional view along A–B in FIG. 3.

The drawing schematically shows a press 1 for pelletizing pressed feed products with a main operating part enclosed in a housing 2 and having a rotary die 3 with a radially perforated steel cylinder 4 for pressing mixed feed under high pressure. The fodder to be pelletized comes in floury or chopped form from a hopper via a mechanical distributor 5 from the front into the body of the die 3, as is indicated in FIG. 4 by the arrow 15.

Inside the cylindrical rotary die 3 pivots 10 and 11 are mounted on a fixed support member 6 together with two oppositely arranged pressing rollers 7 and 8 of which a large roller 7 functions as a principal pressing roller and has a considerably larger diameter than the smaller roller 8 which functions as an auxiliary roller. These rollers both have a honeycombed profiled outer surface and are rotated by friction with the inner surface of the rotary die 3.

Figure 1:
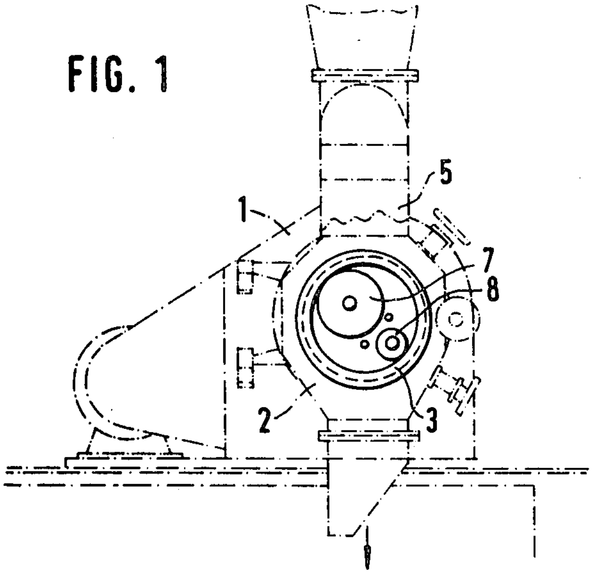
FIG. 1 is a schematic and front elevational view of a pelletizing press.
Figure 2:
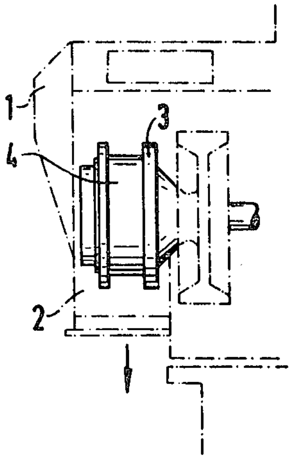
FIG. 2 is a fragmentary schematic view of the press and a side elevational view of the rotating die of the press shown in FIG. 1.
Figure 3:
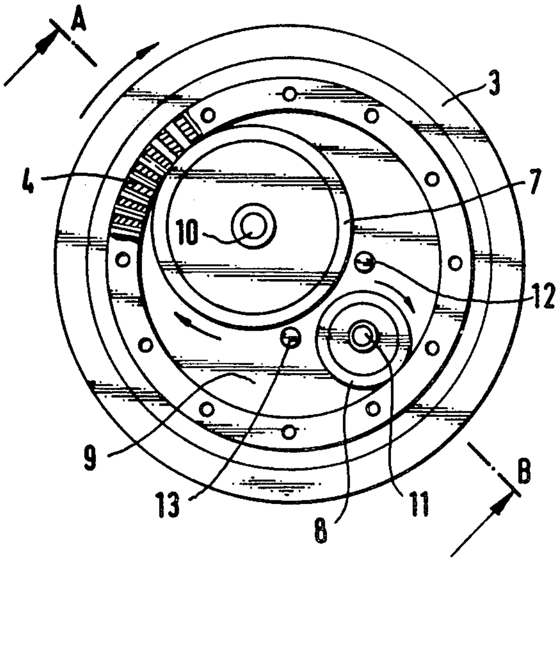
FIG. 3 is a larger scale front view of the pressing rollers in the open die.

It may be seen that for the described pelletizing press with horizontal axis and the indicated direction of rotation, the feed product to be pelletized must be fed into the zone indicated by the letter 9 in FIG. 3.

Thanks to the large diameter of the principal pressing roller 7, the product to be extruded is compressed progressively this being particularly due to the fact that the angle of attack with the rotating die is more acute than with smaller rollers.

An improved compression and an increased pellet production are thus achieved by means of the large principal pressing roller with respect to a conventional pelletizing press which is equipped with pressing rollers of equal and hence smaller size.

Two pins 12 and 13 (FIG. 3) rigidly connect a bearing plate 14 with the fixed support member 6 for the pivots of the pressing rollers so as to prevent any axial displacement of these rollers.

The smaller pressing roller 8 functions as a compensating roller which cooperates with the bearing plate 14 to support the main pressing roller and at the same time partly serves to compress the product within the die.

The pivots 10 and 11 of the pressing rollers 7 and 8 are mounted in an inclined diametral plane of the die 3 as shown in FIG. 3 by A–B, so as to provide a better distribution of the mixed feed product in the rotating die.

In the case of a large pelletizing press, for example with a rotary die having a diameter of one meter, three or more pressing rollers may likewise be provided on the fixed support member 6, one of which serves in each case as a principal pressing roller with a considerably larger diameter while the others serve as smaller auxiliary rollers. In that case the smaller auxiliary rollers which also serve as compensating rollers cooperating with the bearing plate 14 to support the principal pressing roller, will be mounted symmetrically with respect to the inclined plane A–B, i.e. with respect to the common diametral plane of the rotary die and of the main pressing roller.

It has been found by experience that the increased production for the same driving power, which may be achieved by using a larger principal pressing roller according to the invention, results in a substantial decrease in the cost of the pressed feed produced by the pelletizing press.

Various constructive variants may evidently be contemplated in the production of pelletizing presses having pressing rollers with different diameters, with in each case one large principal pressing roller and one or several oppositely arranged, much smaller auxiliary rollers.

I claim:

1. In a pelleting mill for the production of feed pellets or the like by a pelleting action, comprising:

a perforated rotary ring die with at least two rollers oppositely mounted therein and rotatably driven by engagement with said ring die to compress the pellet material between each roller and the ring die, the improvement for increasing the pellet output of the mill, comprising:

said rollers being of substantially different diameters and including a large principal roller for providing a more progressive pressing action to enhance said pelleting action and thereby increase the pellet output of the press and at least one auxiliary roller which has a substantially smaller diameter than said principal roller, said at least one auxiliary roller being mounted in opposed relation to said principal roller so as to provide a compensating action.

2. A pelletizing press according to claim 1, wherein at least two smaller auxiliary pressing rollers are symmetrically mounted with respect to the common diametral plane of the rotary die and the main pressing roller.

3. A pelletizing press according to claim 1, wherein the axes of the large principal pressing roller and of the rotary die are situated in a plane which is inclined with respect to the vertical.

4. In a pelletizing press of the type commonly used for the production of pressed feed pellets from dried grass forage, processed hay and the like, which includes:

a fixed support means having two pivot shafts mounted thereon which are parallel to one another and laterally spaced from one another;

a rotary die, which is journalled for powered rotation on said fixed support means and includes a radially perforated rotary die cylinder having a radially inner surface;

two press rollers, each having a profiled radially outer surface;

the two press rollers being journalled for rotation on respective ones of said two pivot shafts and having the respective radially outer surfaces thereof in frictionally driven relation with said radially perforated die cylinder radially inner surface at generally diametrically opposed sites on said radially inner surface so that pressure between one said press roller and the die cylinder tends to be counter balanced by pressure between the other said press roller and the die cylinder; and wherein the composite width of the two press rollers is generally maximized with respect to the diameter of said die cylinder radially inner surface, by virtue of the two press rollers individually being so large in diameter that said radially outer surface of one of them lies adjacent though spaced from driving engagement with the other of them intermediate an imaginary plane containing their rotation axes, the improvement wherein:

one of said two press rollers, respectively denominated a principal press roller, is of substantially larger diameter than the other of said two press rollers, respectively denominated an auxiliary press roller, so that for a given input of rotational power to said rotary die, at a given rotational speed of said rotary die to maximize production of pellets of a given feed, due to the relatively lower revoluation rate and more acute angle of attack resulting from provision of said substantially larger diameter press roller, compared with use of two press rollers of substantially equal diameter, wear upon said die cylinder radially inner surface is decreased, and throughput capacity is increased.

5. The improved press of claim 4, wherein:

said rotation axes are substantially horizontal and said plane is oblique, with the said axis for said principal press roller lying above said axis for said auxiliary press roller, and said principal press roller leading said auxiliary press roller so that at least in general input feed to said press is pressed against said radially perforated die cylinder first by said principal press roller and later by said auxiliary press roller.

* * * * *